Jan. 23, 1951     C. KRAMER     2,539,087
DETACHABLE HANDLE CONSTRUCTION
Filed Aug. 22, 1949
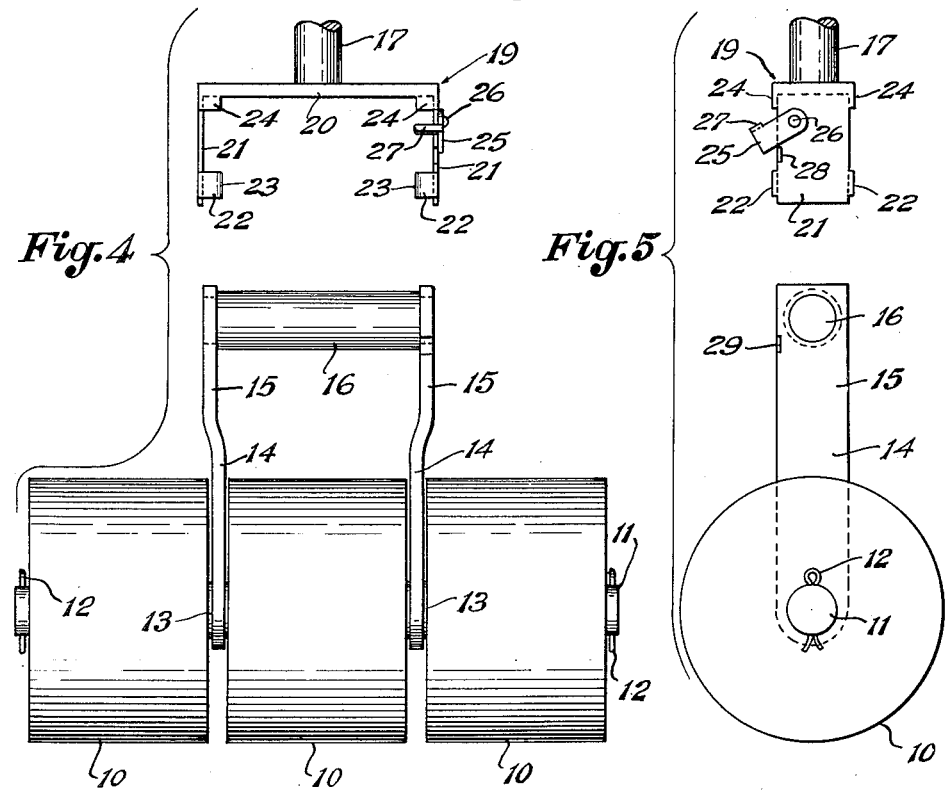
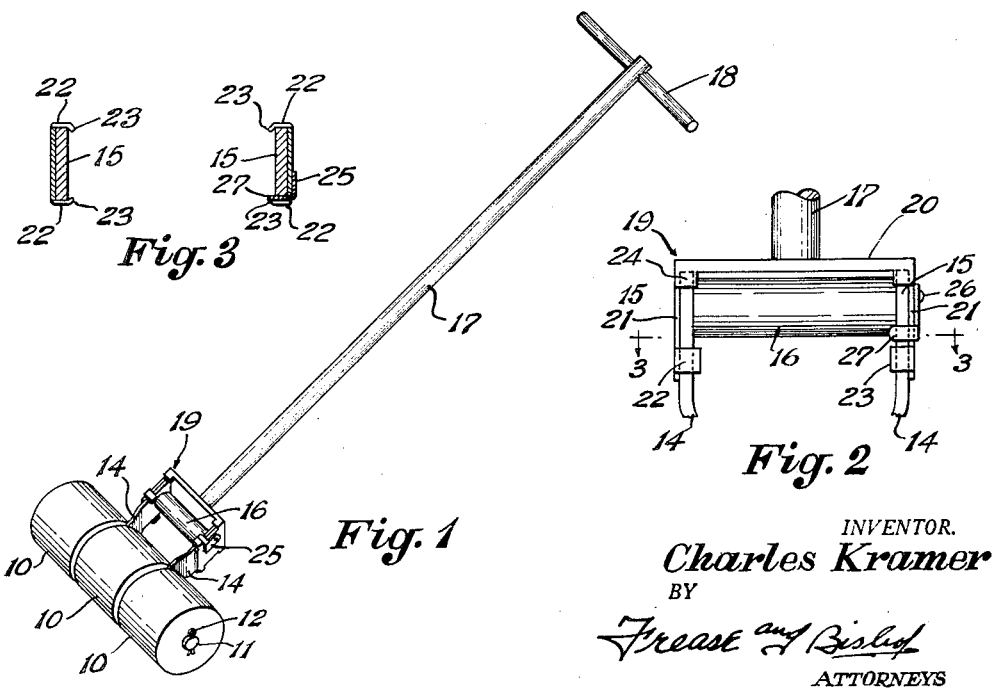
INVENTOR.
Charles Kramer
BY
Frease and Bishop
ATTORNEYS Patented Jan. 23, 1951

2,539,087

UNITED STATES PATENT OFFICE 2,539,087

DETACHABLE HANDLE CONSTRUCTION

Charles Kramer, Wooster, Ohio, assignor to Wooster Products, Inc., Wooster, Ohio, a corporation of Ohio Application August 22, 1949, Serial No. 111,604

2 Claims. (Cl. 306—45)

The invention relates generally to handles for movable tools and appliances, and more particularly to detachable means for connecting elongated handles to floor tools, vehicles, and other equipment which requires or utilizes a detachable handle for moving or operating the same.

In using tools and apparatus having elongated handles, it is desirable to detach the handle from the tool or apparatus for storing or shipping the same. Certain prior tools and equipment have had handles which are screwed into a mounting bracket, but these require screwing the handle up tight during use, and the handle may become difficult to unscrew, or may become loose during use. Where the screwed handle has a crossbar, the crossbar often does not line up properly with the tool or equipment, especially after the handle has been detached and reconnected several times.

Other prior detachable connections between the handle and the tool or apparatus have been relatively complicated, and awkward or tedious to connect and disconnect because they require manipulation of several bolts or screws.

It is an object of the present invention to provide a novel detachable handle construction which overcomes the disadvantages of prior constructions.

Another object is to provide a novel detachable connection for a handle which enables the handle to be attached or detached by simple pushing and pulling operations.

A further object is to provide a novel detachable connection for a handle with a crossbar, by which the crossbar is always lined up properly with the tool or apparatus to which the handle is connected.

Another object is to provide a novel detachable handle connection having a simple and effective latch for locking the handle in connected position.

A still further object is to provide a novel detachable handle connection which is simple and inexpensive to manufacture and is easily manipulated without the use of tools.

These and other objects are accomplished by the parts, combinations and arrangements which comprise the present invention, a preferred embodiment of which is shown by way of example in the accompanying drawing and described in detail in the following specification and defined in the appended claims, the nature of the invention being set forth in the following general statement.

In general terms, the detachable handle construction comprising the present invention includes a handle mounting bracket on the tool or apparatus having two parallel legs projecting outwardly from the apparatus and rigidly held in laterally spaced relation, the end of the handle carrying a yoke having two downwardly extending legs slidably engaged over the bracket legs, the yoke legs having laterally extending fingers engaged around the bracket legs, and a latch pivoted on the yoke for engaging the bracket to lock the yoke on the bracket.

Referring to the drawing forming part hereof, in which a preferred embodiment of the invention is shown by way of example;

Figure 1 is an isometric view showing the detachable handle construction applied between a hand-operated roller and the elongated handle connected thereto;

Fig. 2 is a fragmentary enlarged front elevation of the detachable handle connection shown in Fig. 1;

Fig. 3 is a plan sectional view as on line 3—3, Fig. 2, with distant parts omitted;

Fig. 4 is an enlarged expanded view similar to Fig. 2 showing the detachable handle construction in disconnected position; and Fig. 5 is a side elevation thereof.

Similar numerals refer to similar parts throughout the several views of the drawing.

The novel detachable handle connection is shown in the drawing as applied to a hand roller for rolling linoleum and the like, but it will be understood that invention is applicable to various other floor tools, as well as vehicles and any other equipment where such a handle connection is desirable and useful.

The roller shown in the drawing is preferably a sectional roller having three laterally spaced rollers 10 journaled in a suitable manner on a shaft 11, the outer rollers being retained on the shaft by means of cotter pins 12 and the like, and the rollers being maintained in laterally spaced relation by means of suitable washers 13, between which the legs 14 of a handle mounting bracket are journaled on the shaft.

Preferably, the bracket legs 14 are bent slightly outwardly adjacent the rollers 10, and their outer end portions 15 are straight and held in parallel relation at right angles to shaft 11 by a spacer rod 16 having its ends secured in the upper ends of the legs 15. As indicated in Fig. 5, the end portions 15 of the legs are somewhat wider than the spacer rod 16 so as to overlap the same on each side.

The elongated handle shaft 17 preferably has a handle crossbar 18 at its upper end which is arranged to be parallel with the roller shaft 11 for pushing and pulling the roller. The bottom end of the handle shaft 17 is secured to a yoke indicated generally at 19, the shaft 17 being rigidly secured as by welding to the crossbar 20 of the yoke. The yoke 19 has laterally spaced legs 21 extending downwardly from its ends, and the legs 21 are spaced apart such distance as to slidably and frictionally engage over the upper ends 15 of the mounting bracket legs when the yoke is positioned downwardly thereover.

Preferably the lower ends of the legs 21 have inwardly extending flanges or tongues 22 on their opposite edges, and the inner ends 23 of the tongues are curved or bent toward each other slightly so as to engage around or engirdle the opposite edges of the legs 15 of the mounting bracket. The upper ends of the legs 21 have inwardly extending flanges or tongues 24 for engaging around the edges of the bracket legs 15.

Thus, when it is desired to attach the handle shaft 17 to the mounting bracket of the roller, the yoke 19 is placed with its legs 21 in position to be slid over the legs 15 of the mounting bracket, and by then pressing on the crossbar 20 of the yoke with the foot, the yoke may be pushed over the top of the mounting bracket, with the flanges 22 and 24 engaged around the edges of the bracket legs 15. The amount of overlap of the legs 15 with respect to the spacer rod 16 allows the tongues 22 to pass by the rod 16 as the yoke is pushed over the mounting bracket.

The latch means for locking the handle in connected position on the mounting bracket preferably includes a latch bar 25 pivoted at 26 on the outer surface of one of the legs 21 for swinging in a plane parallel to the leg. The free end of the latch 25 has a locking finger 27 thereon which is adapted to be received in a notch 28 in the adjacent edge of the leg 21. A similar notch 29 is provided in the edge of the bracket leg 15 over which the leg 21 having the notch 28 engages, and the notch 29 is located so as to register with the notch 28 when the yoke 19 is positioned over the mounting bracket as in Figs. 2 and 3.

Accordingly, when the handle yoke 19 is in position over the mounting bracket, the latch is quickly and easily swung with the fingers so that the locking finger 27 is received in the registering notches 28 and 29 of the yoke and mounting bracket, thereby securely locking the handle on the mounting bracket so that it cannot be pulled off or disengaged. When it is desired to detach the handle, it is a simple operation merely to lift the latch out of the notches, whereupon the handle can be removed quickly by placing one foot on the roller and pulling on the crossbar 18.

Due to the fact that the legs 15 are rigidly held in parallel spaced relation at right angles to the roller shaft 11, and the legs 21 of the handle yoke frictionally engage the bracket legs 15, the crossbar 18 of the handle is always parallel or aligned with the roller shaft so as to provide for proper and effective operation of the tool.

The improved detachable handle connection is simple and inexpensive to manufacture, and is attached or detached by simple pushing and pulling operations without requiring any tools to make the connection. The novel latch is manipulated easily with the fingers and provides for selectively locking the handle in position on the mounting bracket of the roller.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. A detachable handle connection for a piece of equipment, including a mounting bracket on the equipment having two laterally spaced parallel legs, a handle yoke having two downwardly extending legs slidably engaged over said mounting bracket legs, laterally extending tongue flanges on said yoke legs engaged around said bracket legs, and a latch pivoted on said yoke for engaging said bracket to lock the yoke on the bracket.

2. A detachable handle connection for a piece of equipment, including a mounting bracket on the equipment having two parallel legs, means rigidly securing said legs in laterally spaced relation, a handle yoke having two downwardly extending legs slidably engaged over said mounting bracket legs, laterally extending tongue flanges on said yoke legs engaged around said bracket legs, one yoke leg and its adjacent bracket leg having registering notches, and a latch pivoted on said one yoke leg and received in said registering notches for locking said yoke and bracket together.

CHARLES KRAMER.

REFERENCES CITED

The following references are of record in the file of this patent:

UNITED STATES PATENTS

| Number | Name | Date |
|---|---|---|
| 515,337 | Hostler | Feb. 27, 1894 |
| 881,556 | Dehler | Mar. 10, 1908 |
| 1,028,182 | Bemis | June 4, 1912 |
| 1,838,829 | Hewig | Dec. 29, 1931 |
| 2,327,229 | Vavrik et al. | Aug. 17, 1943 |

FOREIGN PATENTS

| Number | Country | Date |
|---|---|---|
| 357,200 | Germany | Aug. 19, 1922 |